United States Patent [19]

Hino et al.

[11] Patent Number: 4,463,134
[45] Date of Patent: Jul. 31, 1984

[54] MODIFIED EPOXY RESIN COMPOSITION

[75] Inventors: Minoru Hino, Takatsuki; Takao Oshima, Otsu; Akihiro Tachibana, Funabashi, all of Japan

[73] Assignees: Sumitomo Chemical Company, Limited, Osaka; Tohto Kasei Co., Ltd., Tokyo, both of Japan

[21] Appl. No.: 333,453

[22] Filed: Dec. 22, 1981

[30] Foreign Application Priority Data

Oct. 6, 1981 [JP] Japan .................................. 56-159655

[51] Int. Cl.$^3$ ..................... C08F 36/06; C08F 279/02; C08L 63/02
[52] U.S. Cl. ................................... 525/109; 525/112; 525/113; 525/911
[58] Field of Search ................. 525/113, 911, 112, 109

[56] References Cited

U.S. PATENT DOCUMENTS

| | | | |
|---|---|---|---|
| 4,055,541 | 10/1977 | Riew | 525/911 |
| 4,251,415 | 2/1981 | Nakada et al. | 525/911 |
| 4,260,700 | 4/1981 | Cassutt et al. | 525/113 |
| 4,371,665 | 2/1983 | Hino et al. | 525/113 |

*Primary Examiner*—John C. Bleutge
*Assistant Examiner*—Robert E. L. Sellers
*Attorney, Agent, or Firm*—Birch, Stewart, Kolasch & Birch

[57] ABSTRACT

Modified epoxy resin compositions having excellent flexibility and excellent compatibility with conventional epoxy resins as well as exhibiting the original properties of the epoxy resin before being modified such as mechanical strength, adhesion, heat resistance are disclosed and chemical resistance, which are obtained by treating an epoxy resin with at least one modified adduct [D] of a conjugated diene polymer or copolymer which has an imido bond and/or amido bond and a semi-ester structure and has an acid value owing to a free carboxyl group of 5 to 100. The modified adduct is obtained by reacting an adduct [A] of a polymer of a conjugated diene having a number average molecular weight of 300 to 20,000 or a copolymer of the conjugated diene and a vinyl monomer with an $\alpha,\beta$-unsaturated dicarboxylic acid or its anhydride, with a compound [B] containing one primary amino group in the molecule and a compound [C] containing a hydroxy group in the molecule.

10 Claims, No Drawings

MODIFIED EPOXY RESIN COMPOSITION

BACKGROUND OF THE INVENTION

The present invention relates to a modified epoxy resin composition and a process for modifying an epoxy resin which enhances the overall properties of the resin composition without deteriorating the original excellent properties thereof.

Epoxy resins have usually excellent properties such as excellent mechanical strength, adhesion, heat resistance and chemical resistance, and hence, they are widely used for coating compositions, electrical insulators, materials for civil engineering and construction, adhesives, composite materials, or the like. On the other hand, the cured epoxy resin products are usually inferior in flexibility, and hence, attempts have been made to improve the fragility thereof and to give thereto excellent impact resistance and thermal shock resistance. For instance, it has been proposed to modify the epoxy resin by adding thereto a modifying agent such as polysulfide, polychloroprene, polybutadiene, dimeric acid, polyester ether, polyamide, and so forth, but such methods have some disadvantages in that these result in deterioration of the original properties of the epoxy resin such as the mechanical strength, electric properties, heat resistance, and solvent resistance, corrosion resistance, and further the most suitable method must be individually selected in accordance with the intended utilities. In the case of employing the resin for a coating composition, the epoxy resin should have good impact resistance and adhesion to the substrate as well as solvent resistance, corrosion resistance, and further other properties such as compatibility of the epoxy resin with the modifying agent, homogeneity and film-forming properties of the vehicle resin, crosslinking curing properties, or the like. Such requirements have never been satisfied by the known techniques.

Recently, epoxy resins have been used as a material for cathode electrocoating compositions suitable for coating automobiles, and for such a purpose, there have been proposed various methods for improving the properties of the epoxy resins in order to produce a coating composition having excellent chipping resistance, corrosion resistance, and so forth. Among these, it is proposed to use as a flexibilizer a liquid polybutadiene which has been used for the preparation of anode electrocoating compositions. However, the liquid polybutadiene has insufficient compatibility with the epoxy resin, and even if it is chemically bonded with the epoxy resin by means of an appropriate reactive group, it is still difficult to obtain an excellent composition which can give a clear uniform coating layer. In order to eliminate such a drawback, particularly to improve the compatibility of the flexibilizer with the epoxy resin, various methods have been proposed. For example, it is disclosed in Japanese Patent Publication (unexamined) No. 97632/1979 that a base resin for a cationic electrocoating composition is obtained by reacting a butadiene-acrylonitrile copolymer containing carboxyl groups at both terminal thereof with an epoxy resin. According to this method, the compatibility with the epoxy resin is fairly improved owing to the acrylonitrile group, but it is still insufficient in the clarity of film and flexibility. Moreover, since this copolymer is a comparatively high molecular weight functional polymer, use thereof is restricted; for example, it is required to specify the ratio of the copolymer to the epoxy resin in order to give the desired homogeneity of the electrocoating composition or to regulate the concentration of a cationic group in order to give the desired electrophoresis. This method is also disadvantageous in view of the high cost.

Another approach for improving the flexibility by using a liquid polybutadiene is disclosed in Japanese Patent Publication (unexamined) No. 5933/1980, wherein a reaction product of an epoxy resin with a conjugated diene polymer containing a carboxyl group at the terminal or intermediate of the molecule is used as a base resin for a cationic electrocoating composition. The liquid polybutadiene used in this method is substantially a liquid polybutadiene having a high 1,2-vinyl structure and having carboxyl groups at both terminals, and the liquid polybutadiene is used for improving smoothness and curing properties of the coating film. These liquid polybutadienes having high a 1,2-vinyl structure consist mainly of butadiene skeleton and are still inferior in the compatibility with the epoxy resins.

Another method is proposed in Japanese Patent Publication (unexamined) No. 5932/1980. This literature discloses a resin composition suitable for a cathode precipitating type electrocoating which comprises predominantly a reaction product of a basic resin and an amine-modified epoxy resin, wherein the basic resin is obtained by reacting an anhydrous maleic acid adduct of a liquid polybutadiene or a natural drying oil with a diamine containing a tertiary amino group within the molecule (e.g. N,N-dimethylaminopropanediamine) and an aminoalcohol (e.g. monoethanolamine) or a diamine containing a hydroxy group (e.g. 2-(N,N-dihydroxymethylamino)ethylamine), by which the liquid polybutadiene or natural drying oil is bonded with a tertiary amino group and hydroxy group via an imidohydrocarbon bond. Since the basic resin used in this method contains a large amount of an aliphatic tertiary amino group having a comparatively strong basicity and has a polymerization catalytic activity to the epoxy group, when the basic resin is reacted with the epoxy resin in a system containing an excess amount of epoxy groups, a polymerization reaction due to self ring-opening of the epoxy groups occurs such that the esterification reaction between the carboxyl group of the basic resin and the epoxy group of the epoxy resin is insufficient, which unfavorably results in gelation of the system. Accordingly, in the method of Japanese Patent Publication (unexamined) No. 5932/1980, the amination of the epoxy resin is carried out while preventing the above-mentioned undesirable side reaction by means of carrying out the reaction in the presence of an equimolar amount of an amine to the excess epoxy groups, or charging the basic resin into the system after partial progression of the amination reaction.

Thus, it is required to introduce flexibility to epoxy resins not only in the field of cationic electrocoating but also in other coating fields and in the production of various molded products.

Under the circumstances, the present inventors have intensively studied improving a process for modifying epoxy resins in order to obtain an improved modified epoxy resin having excellent properties suitable for various requirements and various utilities. As a result, it has been found that the desired modified epoxy resin can be obtained by reacting or mixing an epoxy resin with a specified modified adduct of a conjugated diene polymer or copolymer.

SUMMARY OF THE INVENTION

An object of the present invention is to provide an improved modified epoxy resin comprising a cured product having excellent flexibility and excellent compatibility with other epoxy resins. Another object of the invention is to provide an improved process for modifying epoxy resins in order to impart to them various additional excellent properties without deteriorating the original properties thereof. These and other objects as well as advantages of the present invention will be apparent to those skilled in the art from the following description.

DETAILED DISCUSSION OF THE INVENTION

The improved epoxy resin of the present invention is obtained by treating an epoxy resin with at least one modified adduct [D] of a conjugated diene polymer or copolymer which has an imido bond and/or amido bond and a semi-ester structure and has an acid value owing to a free carboxyl group of 5 to 100, preferably 10 to 50, the modified adduct being obtained by reacting an adduct [A] of a polymer of a conjugated diene having a number average molecular weight of 300 to 20,000, preferably 500 to 5,000, or a copolymer of the conjugated diene and a vinyl monomer with an $\alpha,\beta$-unsaturated dicarboxylic acid or its anhydride, with a compound [B] of the formula:

   [I]

wherein $R_1$ is an aliphatic hydrocarbon group having 1 to 18 carbon atoms or an alicyclic hydrocarbon group having 3 to 18 carbon atoms, the aliphatic and alicyclic hydrocarbon groups containing optionally an ether bond, and a compound [C] of the formula:

   [II]

wherein $R_2$ is a saturated or unsaturated hydrocarbon group having 1 to 18 carbon atoms which may optionally contain a cyano, a halogen, an ether bond or an ester bond, and n is an integer of from 0 to 3.

The modified epoxy resin of the present invention is characteristic in that it has good compatibility with the conventional epoxy resins, such as epi-bis type epoxy resins derived from bisphenol A and epichlorohydrin, polyglycidylether type epoxy resins derived from a novolac resin, polyglycidyl amine type epoxy resins derived from an aromatic amine, and polyglycidyl ester type epoxy resins derived from an aromatic polycarboxylic acid, and that when it is used for coating compositions, it can produce a clear cured film having excellent flexibility.

The present invention is also characteristic in that the most suitable micro structure or molecular weight of the conjugated diene polymer or copolymer can freely be selected in accordance with the requirements and utilities of the final products. For instance, when a liquid polybutadiene rich in cis-1,4 bond is used as a base of the modified adduct, a comparatively small amount of the modified adduct can give the desired flexibility to the epoxy resin. When an adduct having a high 1,2-vinyl structure is used, there can be obtained a hard composition. Besides, by controlling an amount of the $\alpha,\beta$-unsaturated dicarboxylic acid or its anhydride (e.g. maleic anhydride) introduced into the liquid polybutadiene or by controlling the modifying conditions, the dicarboxylic acid or its anhydride can react with the liquid polybutadiene in an amount equimolar or nearly equimolar to the epoxy resin (as calculated as a monomer).

The conjugated diene polymer used in the present invention has a number average molecular weight of 300 to 20,000, preferably 500 to 5,000. The conjugated diene polymer includes a homopolymer of a conjugated diene monomer and also a copolymer thereof with other copolymerizable monomers. The micro structure of the double bond does not affect the preparation of the adduct and the polymer may contain an optional ratio of 1,4-bond, 1,2-bond or 3,4-bond.

Suitable examples of the conjugated diene monomer are butadiene, isoprene, chloroprene, 1,3-pentadiene, or the like. Suitable examples of other copolymerizable monomers are vinyl monomers such as acrylic acid esters (e.g. methyl acrylate, ethyl acrylate, etc.), methacrylic acid esters (e.g. methyl methacrylate, ethyl methacrylate, etc.), acrylonitrile, styrene, acetylene, ethylene, propylene, or the like, which may be used alone or in combinations of two or more thereof. The conjugated diene copolymer contains preferably 50% by mole or more of the conjugated diene monomer, preferably butadiene or isoprene. The conjugated diene polymer and copolymer may also contain carboxyl and/or hydroxy groups.

The $\alpha,\beta$-unsaturated dicarboxylic acid or its anhydride includes maleic anhydride, maleic acid, fumaric acid, itaconic acid, citraconic acid, or the like, among which maleic anhydride is particularly suitable. In accordance with variations of the micro structure and molecular weights of the conjugated diene polymer or copolymer, the kinds of the copolymerizable monomers and also the desired utilities of the final products, the most suitable amount of the $\alpha,\beta$-unsaturated dicarboxylic acid or its anhydride and also the most suitable kind and amount of the compounds [B] and [C] are carefully selected.

The compound [B] of the formula [I] contains a primary amino group and an aliphatic or alicyclic hydrocarbon group in the molecule.

Suitable examples of the compound of the formula [I] are saturated aliphatic amines such as methylamine, ethylamine, n-propylamine, isopropylamine, n-butylamine, isobutylamine, sec-butylamine, tert-butylamine, n-amylamine, isoamylamine, tert-amylamine, 1,2-dimethylpropylamine, hexylamine, heptylamine, octylamine, 2-ethylhexylamine, nonylamine, decylamine, laurylamine, tetradecylamine, hexadecylamine, or octadecylamine; unsaturated aliphatic amines such as vinylamine, allylamine, methallylamine, 1-amino-4-pentene, propargylamine, 3-amino-3-methyl-1-butyne, or oleylamine; amines containing an ether group such as 2-aminoethyl ethyl ether, 3-methoxypropylamine, 3-ethoxypropylamine, propoxypropylamine, isopropoxypropylamine, butoxypropylamine, isobutoxypropylamine, 2-ethylhexyloxypropylamine, decyloxypropylamine, lauryloxypropylamine, myristyloxypropylamine, or furfurylamine; alicyclic amines such as cyclopropylamine, cyclopropylmethylamine, cyclobutylamine, cyclopentylamine, cyclohexylamine, cycloheptylamine, or alkyl-substituted derivatives thereof.

These compounds may be used in a single compound or in combinations of two or more thereof.

The compound [C] of the formula [II] contains a hydroxy group in the molecule.

Suitable examples of the compound of the formula [II] are saturated alcohols such as methanol, ethanol, n-propanol, isopropanol, n-butanol, isobutanol, sec-butanol, tert-butanol, n-amyl alcohol, activated amyl alcohol, isoamyl alcohol, sec-amyl alcohol, 3-pentanol, tert-amyl alcohol, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-dodecanol, trimethylnonyl alcohol, tetradecanol, heptadecanol, or octadecanol; unsaturated alcohols such as allyl alcohol, crotyl alcohol, 3-buten-2-ol, propargyl alcohol, or oleyl alcohol; benzyl alcohol, phenethyl alcohol, cinnamyl alcohol, benzyloxyethanol, and their nucleus-substituted derivatives; halogenated alcohols such as ethylene chlorohydrin; ethylene cyanohydrin, furfuryl alcohol, tetrahydrofurfuryl alcohol; glycol monoalkyl ethers such as ethylene glycol monoalkyl ethers, diethylene glycol monoalkyl ethers, triethylene glycol monoalkyl ethers which have 1 to 8 carbon atoms in the alkyl moiety; ethylene oxide adducts such as phenol ethylene oxide adduct, in alkylphenol ethylene oxide adduct, an aliphatic or aromatic monocarboxylic acid ethylene oxide adduct; hydroxyalkyl acrylates or methacrylates such as 2-hydroxyethyl methacrylate, 2-hydroxyethyl acrylate, 3-hydroxypropyl methacrylate, 3-hydroxypropyl acrylate; and further glycidol, cyclohexanol, glycerin dichlorohydrin, glycerin di-aliphatic carboxylate, abiethinol, or the like. These compounds may be used alone or in combination of two or more thereof.

The amount of $\alpha,\beta$-unsaturated dicarboxylic acid or its anhydride may vary depending on the molecular weight of the conjugated diene polymer or copolymer to be reacted, but is usually in such a range that the content of the $\alpha,\beta$-unsaturated dicarboxylic acid or its anhydride in the adduct [A] becomes 5 to 50% by weight, preferably 5 to 30% by weight. When the content of $\alpha,\beta$-dicarboxylic acid or its anhydride in the adduct [A] is lower than 5% by weight, the obtained modified epoxy resin shows inferior compatibility with other epoxy resins, and on the other hand, when the content is over 50% by weight, the modification process can hardly be carried out because of the increased viscosity of the reaction system.

The adduct [A] of the conjugated diene polymer or copolymer with the $\alpha,\beta$-dicarboxylic acid or its anhydride can be prepared by any conventional method, for example, by mixing a conjugated diene polymer or copolymer and an $\alpha,\beta$-dicarboxylic acid or its anhydride (e.g. maleic anhydride) and reacting them under an inert gas at a temperature of 50° to 300° C., preferably 150° to 210° C., for 30 minutes to 10 hours, preferably 2 to 6 hours. In this reaction, an antigelling agent may optionally be added in an amount of 0.01 to 5% by weight, and further an inert organic solvent may be used.

The modified adduct [D] can be prepared by reacting the adduct [A] with an amino compound [B] of the formula [I] and a compound [C] containing a hydroxy group of the formula [II], wherein the compound [B] and the compound [C] are used in an amount of 5 to 95% by mole and 95 to 5% by mole, respectively, to 1 mole of the $\alpha,\beta$-dicarboxylic acid or its anhydride (e.g. maleic anhydride) bonded to the conjugated diene polymer or copolymer. In this reaction, the compound [B] is reacted with the acid or its anhydride group contained in the adduct [A] and is almost derived into imido bond, but it may optionally be derived into an amido bond-carboxylic acid skeleton. Besides, the compound [C] is derived into an ester bond-carboxylic acid skeleton.

The modified adduct [D] contains preferably at least 0.5 equivalent weight, preferably 0.75 equivalent weight or more, of a free carboxyl group (as calculated as —COOH number) per one molecule of the conjugated diene polymer or copolymer (as calculated based on the average molecular weight). In this respect, the suitable amounts of the compound [B] and compound [C] are also determined.

The reaction of the adduct [A] with the compounds [B] and [C] may be carried out simultaneously in the same reaction system or in sequence, that is, by reacting firstly the adduct [A] with the compound [B] or [C] (preferably compound [C]) and adding the compound [C] or [B] (preferably compound [B]) to the reaction system preferably after partially proceeding the above reaction, and then completing the reaction of the adduct [A] and the compounds [B] and [C]. Thus, the reaction of adduct [A] with the compounds [B] and [C] can follow one of the procedures:

(1) The adduct [A] is mixed with the compound [B] and the compound [C] and the mixture is simultaneously subjected to the reaction;

(2) The adduct [A] is first, preferably partially, reacted with the compound [C], and subsequently the compound [B] is reacted with the resulting reaction mixture;

(3) The adduct [A] is reacted with the compounds [B] and [C] while adding dropwise a mixture of the compounds [B] and [C] to the reaction system; and (4) The adduct [A] is first, preferably partially, reacted with the compound [B], and subsequently the compound [C] is reacted with the resulting reaction mixture.

When the adduct [A] is first reacted with an equimolar or excess amount of the compound [C], are or most acid anhydride groups contained in the adduct [A] are ring-opened to give a partially esterified product, and then, the extra partial ester bonds may be converted into imido bonds by reacting the product with the compound [B] of a predetermined amount. In this case, the suitable amount of the compound [B] is determined so that the ratio of the substituents in the final product falls in the suitable range.

By the reaction of the adduct [A] and the compound [C], there is obtained a partially esterified product. This reaction can be carried out by any conventional method, for example, by reacting the adduct [A] with the compound [C] at a temperature of 30° to 200° C., preferably 80° to 160° C., for 30 minutes to 5 hours, usually in the presence of a slight amount of a catalyst selected from quaternary ammonium salts, tertiary amines, alkali metal salts, or organic acids, wherein an inert solvent such as toluene, xylene, methyl isobutyl ketone or ethylene glycol ethyl ether monoacetate may optionally be used.

The reaction of the adduct [A] and the compound [B] is also carried out by any conventional method, for example, by reacting the adduct [A] or the partial reaction product of the adduct [A] and the compound [C] with the compound [B] at a temperature of 30° to 250° C., preferably 30° to 180° C., while removing the by-produced water. Since this reaction is occasionally accompanied with exotherm or foaming, the compound [B] is dividedly added to the reaction system, or an appropriate inert solvent as mentioned above is used. In order to obtain partially amidated products, it is preferable to carry out the reaction at a temperature not highter than 100° C.

The finishing point of the above-mentioned reactions may be determined by gas chromatography, IR spectrum, or based upon the amount of the by-produced water, but it is usually easily determined by measuring an acid value, amine value or saponification value of the reaction system.

Modification of an epoxy resin with the modified adduct [D] thus obtained is carried out by mixing an epoxy resin containing at least one epoxy group, preferably two or more epoxy groups with the modified adduct [D] and reacting the mixture under an inert gas at a temperature of 50° to 250° C., preferably 80° to 200° C., for 30 minutes to 10 hours, wherein appropriate catalyst and solvent as mentioned above may optionally be used. The reaction is usually carried out while checking the acid value of the system in order to determine the finishing point.

The amount of the modified adduct [D] may vary with the requirements and utilities of the final modified epoxy resins, but is usually in the range of 5 to 150 parts by weight, preferably 5 to 100 parts by weight, to 100 parts by weight of the epoxy resin.

The modified epoxy resin obtained by the present invention contains an epoxy group in the molecule, and hence, can be used like the conventional unmodified epoxy resins and can give a cured product having excellent flexibility and thermal shock resistance with keeping excellent mechanical strength, adhesion, heat resistance, and chemical resistance. Thus, the modified epoxy resin of the present invention can be used as a cationic electrocoating composition having excellent chipping resistance and corrosion resistance by aminating the remaining epoxy groups of the modified epoxy resin and also using isocyanate compounds. Besides, the modified epoxy resin of the present invention can be used for the preparation of various coating compositions by incorporating together with a suitable curing agent. Moreover, a liquid resin obtained by modifying an epoxy resin having a low molecular weight according to the present invention is suitable as a cast resin having excellent thermal shock resistance.

PREFERRED EMBODIMENTS

The present invention is illustrated by the following Examples, but is not limited thereto.

EXAMPLE 1

A liquid polybutadiene (number average molecular weight: 1680, viscosity at 20° C.: 650 cp, iodine value (Wijs method): 445, cis-1,4 structure: 76%, trans-1,4 structure: 28%, and 1,2-vinyl structure: 1%) (1280 g), maleic anhydride (320 g) and iron naphthenate (Fe: 5.0%) (2.7 g) are charged into a 2 liter four-necked flask, and the mixture is reacted under nitrogen gas at 190° C. for 4 hours to give maleinated polybutadiene (total acid value: 218).

Into a 500 ml four-necked flask are charged the maleinated polybutadiene obtained above (250 g), butyl cellosolve (15.3 g), 2,6-di-tert-butyl-4-methylphenol (hereinafter, referred to as "BHT") (2.5 g), toluene (67.0 g) and benzyldimethylamine (0.16 ml), and the mixture is reacted under nitrogen gas at 120° C. for 2 hours, by which the acid value of the reaction system becomes 151. To the reaction mixture is added a solution of cyclohexylamine (35.9 g) in toluene (35.6 g) through a dropping funnel while controlling the raising temperature due to exotherm below 130° C. With giving attention to occurrence of foaming, the temperature of the reaction mixture is gradually raised until the final temperature becomes 180° C., during which the by-produced water and toluene are distilled off. When all materials having low boiling points are removed and the acid value of the reaction product becomes equilibrium at 24.7, the heating is stopped, by which there is obtained a viscous modified adduct (total amine value: 0, remaining toluene: less than 1%).

The modified adduct thus obtained (200 g), an epi-bis type epoxy resin (epoxy equivalent weight: 488) (300 g, ethylene glycol ethyl ether monoacetate (hereinafter, referred to as "EGA") (167 g) and benzyltrimethylammonium chloride (67 mg) are reacted under nitrogen gas at 150° C. for 3 hours, by which the acid value of the reaction system becomes almost zero (0). The liquid modified epoxy resin has an epoxy equivalent weight of 953 (converted as solid component) (calculated from the remaining epoxy groups thereof).

When the liquid modified epoxy resin (267 g), EGA (28 g) and diethanolamine (22.0 g) are reacted under nitrogen gas at 80° C. for 3 hours, it is confirmed that the epoxy group is reacted. The epoxy resin containing an amino group obtained by the above reaction has a hydroxy group equivalent weight of 220 g/eq.

To the epoxy resin containing amino group obtained above is added dropwise a 70% solution (137 g) of 2-ethylhexanol-semiblocked tolylene diisocyanate (2,4-bond/2,6-bond: 80/20%) in EGA, and the mixture is reacted at 80° C. for 2 hours to give a urethane-cross-linked type resin. The liquid resin thus obtained (450 g) is neutralized with acetic acid (8.7 g) with stirring, and thereto is gradually added a deionized water (1440 g) to give a homogeneous electrocoating composition (pH 6.0) (This liquid composition is hereinafter referred to as "A composition").

A pigment paste is prepared as follows.

The A composition obtained above (100 g), titanium oxide (rutile type) (72.9 g) and carbon black (5.9 g) are mixed with a paint conditioner for 30 minutes in order to disperse well the pigments.

To A composition (1790 g) is added with stirring dibutyl tin dilaurate (1.6 g), and thereto is gradually added the pigment paste obtained above (178.8 g) to give a homogeneous cationic electrocoating composition.

EXAMPLE 2

An electrocoating composition is prepared by using the same maleinated polybutadiene as obtained in Example 1 in the same manner as described in Example 1 except that allyl alcohol is used as a semi-esterifying agent and oleylamine is used as an imidating agent.

EXAMPLE 3

An electrocoating composition is prepared by using the same maleinated polybutadiene as obtained in Example 1 in the same manner as described in Example 1 except that butyl cellosolve is used as a semi-esterifying agent and 3-methoxypropylamine is used as an imidating agent.

REFERENCE EXAMPLE 1

A mixture of an epi-bis type epoxy resin (epoxy equivalent weight: 490) (980 parts by weight) and methyl isobutyl ketone (297.5 parts by weight) is kept at 50°-60° C., and thereto is added dropwise diethanolamine (210 parts by weight) over a period of 60 minutes, and the mixture is reacted for 60 minutes to give an amino group-containing epoxy resin.

To the resin thus obtained (660 parts by weight) is added dropwise the same semi-blocked tolylene diisocyanate as used in Example 1 (412.4 parts by weight), and the mixture is reacted at 80° C. for 2 hours and thereto is added butyl cellosolve acetate (94.3 parts by weight) to give a urethane-crosslinked type resin (nonvolatile part: 70%). The liquid resin thus obtained is neutralized with acetic acid with stirring and thereto is added a deionized water (3733.4 parts by weight) to give a homogeneous electrocoating composition (pH 6.0). By using this composition, a homogeneous cationic electrocoating composition is prepared in the same manner as described in Example 1. The composition has a nonvolatile part of 20% and a pigment weight concentration of 20%.

The cationic electrocoating compositions prepared in Examples 1, 2 and 3 and Reference Example 1 were subjected to electrocoating by using a steel plate treated with iron phosphate as a cathode and carbon plate as an anode at 20°-30° C. with stirring at 120 V for 3 minutes. After the electrocoating, the coated steel plate was washed with water, and cured at 180° C. for 20 minutes to give a cured film having excellent gloss and gray color. Various properties of the test samples thus obtained were tested. The results are shown in Table 1.

TABLE 1

| | Ex. 1 | Ex. 2 | Ex. 3 | Ref. Ex. 1 |
|---|---|---|---|---|
| Dispersibility of pigment | ⊚ | ⊚ | ⊚ | ⊚ |
| Thickness of film (μ) | 20 | 20 | 20 | 20 |
| Smoothness of the coating surface | ⊚ | ⊚ | ⊚ | ⊚ |
| Pencil hardness | 4H | 4H | 4H | 3H |
| Erichsen test | 7 mm | 7.3 mm | 6.8 mm | 3 mm |
| Erichsen, crosscut, peeling of tape*1 | 100/100 | 100/100 | 100/100 | 2/100 |
| Bending resistance*2 | ⊚ | ⊚ | ⊚ | x |
| Impact resistance*3 | | | | |
| Surface | ⊚ | ⊚ | ⊚ | x |
| Reverse | ○ | ○ | ○ | x |
| Salt spray test*4 | ⊚ | ⊚ | ⊚ | ⊚ |

[Remarks]: Evaluation was done as follows:
⊚: Excellent, ○: Good, x: Bad
*1 The surface of the cured film was crosscut in checkerboard-like lines to form 100 squares (1 mm × 1 mm). The samples were dipped into hot water at 50° C. for 500 hours. After removal of the sample films from dipping bath, the wet surfaces of the sample films were wiped softly and air-dried. A cellophane tape was adhered on the surface of the sample film crosscut and was peeled off. The number of squares remained without being peeled off was counted, and the results are shown as the number of remained squared/100 (original number of squares).
*2 The test samples were bent by winding them around a column having a diameter of 2 mm, and the surface was observed.
*3 A load of 500 g was fallen on the test samples (on the coated surface or on the reverse side) from the height of 50 cm at a point of impact of ½", and the degree of damage of the coating film was observed.
*4 A 5% saline (35° C.) was sprayed onto the coated surface of the test samples for 1000 hours, and the degree of damage of the coated film was observed.

As is clear from the above test results, it was confirmed that the compositions of Examples 1, 2, and 3 of the present invention showed sufficient flexibility and adhesion and also excellent corrosion resistance.

EXAMPLE 4

The modified adduct obtained in Example 1 (80 g), an epi-bis type epoxy resin (epoxy equivalent weight: 187) (120 g) and benzyltrimethylammonium chloride (20 mg) are reacted under nitrogen gas at 150° C. for 2 hours to give a pale yellow clear modified resin (acid value: 0, epoxy equivalent weight: 370, viscosity at 50° C.: 10,000 cp).

The modified epoxy resin thus obtained (100 parts by weight) and diaminodiphenylmethane (25 parts by weight) are mixed, poured into a fixed mold and then cured under the conditions of 80° C. for 2 hours, 120° C. for 2 hours, and 160° C. for 2 hours in series.

The cured product thus obtained were subjected to Charpy impact test and also to a thermal shock test.

The thermal shock test was carried out as follows: The epoxy resin composition was cured in an aluminum-made cup (diameter: 5 cm, height: 1.5 cm) wherein a bolt-nut washer was contained. The resulting cured product wherein the washer was embedded was taken out, and was subjected to heating-cooling cycle, i.e. repeating of heating at 100° C. and then cooling at 0° C. for each 30 minutes, and then, the number of the cycle until the sample was cracked was counted.

For comparison purpose, in the same manner as above except that an unmodified epi-bis type epoxy resin (epoxy equivalent weight: 187) was used instead of the modified epoxy resin, a cured test sample was prepared and subjected to the tests, likewise.

The results of the above tests are shown in Table 2.

TABLE 2

| | Modified epoxy resin of the present invention | Unmodified epoxy resin |
|---|---|---|
| Charpy impact test | 8.5 kg · cm/cm² | 4.5 kg · cm/cm² |
| Thermal shock test (number of cycle) | More than 10 times | 0 time |

EXAMPLE 5

The maleinated polybutadiene obtained in Example 1 (250 g), benzyl alcohol (13.9 g), BHT (2.5 g), toluene (67 g) and benzyltrimethylammonium chloride (27 mg) are reacted under nitrogen gas at 120° C. for 2 hours, by which the acid value of the reaction mixture becomes 150. To the reaction mixture is added gradually a mixture of n-butylamine (26.5 g) and toluene (26.5 g) at 65°-70° C. The mixture is reacted by raising the temperature up to final 180° C. with paying attention to preventing foaming, while taking out the by-produced water and toluene. When the lowering of acid value becomes equilibrium, the heating is stopped, by which there is obtained a modified adduct (acid value: 25.0, total amine value: less than 1, viscosity at 60° C.: 6,800 cp).

The modified adduct thus obtained (30 g) and an epi-bis type epoxy resin (epoxy equivalent weight: 488) (70 g) are reacted under nitrogen gas at 150° C. for 3 hours to give a modified epoxy resin being rich in clarity (acid value: 0, epoxy equivalent weight: 770).

The modified epoxy resin thus obtained was subjected to the following tests.

The modified epoxy resin (10 g), diaminodiphenylmethane (0.65 g) and EGA (3.0 g) were mixed well and the resulting solution was coated onto a soft steel panel and cured at 180° C. for 20 minutes to give a homogeneous clear cured film having gloss (pencil hardness: 2H).

A cured coating film (thickness: 30μ) was prepared likewise and crosscut in the same manner as described in Remark *1) in Table 1, followed by subjecting to the bending test and peeling test of a cellophane tape likewise. As a result, no change of the coating surface and hence, it was confirmed that the coating film showed excellent flexibility and adhesion.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A modified epoxy resin composition, which comprises an epoxy resin and a modified adduct [D] of a conjugated diene polymer or copolymer which has an imido bond and/or amido bond and a semi-ester structure and has an acid value owing to a free carboxyl group of 5 to 100, said modified adduct being obtained by reacting in the absence of an epoxy resin an adduct [A] of a polymer of a conjugated diene having a number average molecular weight of 300 to 20,000 or a copolymer of the conjugated diene and a vinyl monomer with an $\alpha,\beta$-unsaturated dicarboxylic acid or its anhydride, with a compound [B] of the formula:

$$R_1-NH_2 \qquad [I]$$

wherein $R_1$ is an aliphatic hydrocarbon group having 1 to 18 carbon atoms or an alicyclic hydrocarbon group having 3 to 18 carbon atoms, said aliphatic and alicyclic hydrocarbon groups containing optionally an ether bond, and a compound [C] of the formula:

$$R_2(-CH_2)_n OH \qquad [II]$$

wherein $R_2$ is a saturated or unsaturated hydrocarbon group having 1 to 18 carbon atoms which may optionally contain cyano, a halogen, an ether bond to an ester bond, and n is an integer of from 0 to 3.

2. A modified epoxy resin composition according to claim 1, wherein said conjugated diene monomer is selected from at least one member of the group consisting of butadiene, isoprene, chloroprene, and 1,3-pentadiene, and said vinyl monomer is selected from at least one member of the group consisting of an acrylic acid ester, a methacrylic acid ester, acrylonitrile, styrene, acetylene, ethylene, and propylene.

3. A modified epoxy resin composition according to claim 1, wherein said $\alpha,\beta$-unsaturated dicarboxylic acid is selected from at least one member of the group consisting of maleic, anhydride, maleic acid, fumaric acid, itaconic acid, and citraconic acid.

4. A modified epoxy resin composition according to claim 1, wherein said epoxy resin contains at least one epxoy group.

5. A modified epoxy resin composition according to claim 1, wherein said modified adduct [D] is used in an amount of 5 to 300 parts by weight to 100 parts by weight of said epoxy resin.

6. A process for producing a modified epoxy resin composition which comprises mixing an epoxy resin with at least one modified adduct [D] of a conjugated diene polymer or copolymer which has an imido bond and/or amido bond and a semi-ester structure and has an acid value owing to a free carboxyl group of 5 to 100, said modified adduct being obtained by reacting in the absence of an epoxy resin an adduct [A] of a polymer of a conjugated diene having a number average molecular weight of 300 to 20,000 or a copolymer of the conjugated diene and a vinyl monomer with an $\alpha,\beta$-unsaturated dicarboxylic acid or its anhydride, with a compound [B] of the formula:

$$R_1-NH_2 \qquad [I]$$

wherein $R_1$ is an aliphatic hydrocarbon group having 1 to 18 carbon atoms or an alicyclic hydrocarbon group having 3 to 18 carbon atoms, said aliphatic and alicyclic hydrocarbon groups containing optionally an ether bond, and a compound [C] of the formula:

$$R_2(-CH_2)_n OH \qquad [II]$$

wherein $R_2$ is a saturated or unsaturated hydrocarbon group having 1 to 18 carbon atoms which may optionally contain cyano, a halogen, an ether bond or an ester bond, and n is an integer of from 0 to 3.

7. The process of claim 6 wherein said conjugated diene monomer is selected from at least one member of the group consisting of butadiene, isoprene, chloroprene, and 1,3-pentadiene, and said vinyl monomer is selected from at least one member of the group consisting of an acrylic acid ester, a methacrylic acid ester, acrylonitrile, styrene, acetylene, ethylene, and propylene.

8. The process of claim 6 wherein said $\alpha,\beta$-unsaturated dicarboxylic acid is selected from at least one member of the group consisting of maleic anhydride, maleic acid, fumaric acid, itaconic acid, and citraconic acid.

9. The process of claim 6 wherein said epoxy resin contains at least one epxoy group.

10. The process of claim 6 wherein said modified adduct [D] is used in an amount of 5 to 300 parts by weight to 100 parts by weight of said epoxy resin.

* * * * *